United States Patent [19]

Nagano et al.

[11] Patent Number: 4,586,802
[45] Date of Patent: May 6, 1986

[54] CAMERA CAPABLE OF SPECIAL EFFECTS PHOTOGRAPHY

[75] Inventors: Akihiko Nagano; Kiyoshi Iizuka, both of Kanagawa, Japan

[73] Assignee: Canon Kabushiki Kaisha, Tokyo, Japan

[21] Appl. No.: 723,664

[22] Filed: Apr. 16, 1985

[30] Foreign Application Priority Data

Apr. 16, 1984 [JP] Japan .................... 59-76287

[51] Int. Cl.⁴ .................... G03B 11/00; G03B 13/02
[52] U.S. Cl. .................... 354/219; 354/295
[58] Field of Search ........... 354/152, 159, 219, 224, 354/225, 295

[56] References Cited

U.S. PATENT DOCUMENTS 1,460,744  7/1923  Boysen .................... 354/295 X
2,169,688  8/1939  Frotschner .................... 354/219
3,067,664 12/1962  Winslow .................... 354/295 X Primary Examiner—William B. Perkey
Attorney, Agent, or Firm—Toren, McGeady, Stanger, Goldberg & Kiel

[57] ABSTRACT

A camera for making photographs with special effects comprising a photographic optical system having a path of light for forming an object image on an image receiver, a finder optical system having an optical path for observing a special effect filter arranged in the photographic optical path to bring about a special portrayal effect on the image of the object, and an auxiliary filter having a different characteristic from that of the special effect filter and arranged in the observing optical path to bring about a special effect on the object image to be observed.

9 Claims, 5 Drawing Figures

CAMERA CAPABLE OF SPECIAL EFFECTS PHOTOGRAPHY

BACKGROUND OF THE INVENTION

This invention relates to silver-halide cameras, or still or movie type video cameras, and more particularly to cameras capable of special portrayal effect photography. Still more particularly it relates to a special filter equipped camera of which the photographic optical system and finder optical system have respective filters of different characteristic, and a photographic method which is particularly advantageous when a filter is of the phase type for soft focus is used.

From the past, for cameres of the type having the photographic optical path and the observation optical path in separation, there have been many situations where a low pass filter or soft focus filter or other special filter is releasably attached to the photographic optical system for the purpose of obtaining a special photographic effect. In such a case, the photographer is informed of the fact that the camera has been set up with the special filter by either a mechanical display or an electrical display in the inside of the finder or on the outside of the camera housing. This method, however, though enabling the photographer to know whether or not the camera is ready to make photographs with the special effect, cannot provide resemblance of the picture being observed through the finder system to that which will be finally produced, for example, on the print in the case of the photographic camera, or which will be viewed on the Brown tube in the case of the video camera. For this reason, there has been a problem that the photographer cannot presume what image quality will be produced in the final picture when shooting.

SUMMARY OF THE INVENTION

An object of the present invention is to make it possible for the photographer to visually presume the special portrayal effect produced in an image being photographed.

Another object of the invention is to provide a camera in which the image to be observed is made to have an equivalent special portrayal effect to that which will appear in the picture taken on the print or the picture reproduced on the television set.

Still another object of the invention is to allow for a most desired soft focus effect to be produced in the final picture.

A further object of the invention is to provide a camera of which the photographic and finder optical systems have phase type filters having phase difference dots arranged at random, wherein the cut-off frequency of the filter in the finder is made lower than that of the filter in the photographic optical system.

DESCRIPTION OF THE PREFERRED EMBODIMENT

Figure 1:
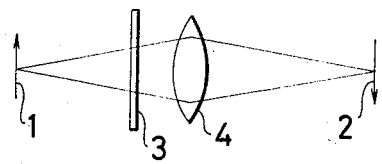
FIG. 1 is a schematic diagram of a filter arrangement in the photographic system.
Figure 3:
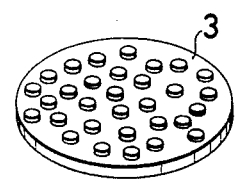
FIG. 3 is a perspective view of a phase type filter.

The present invention is described in connection with an example of application to a film camera by reference to the drawings. FIG. 1 is considered to explain the property of the phase type filter. 1 is an object; and 2 is an image of the object 1 formed on an image receiver such as silver halide film. Indicated at 3 is a special portrayal filter for producing a soft focus effect. In this instance, as shown in FIG. 3, the filter is in the form of the phase type constructed with a glass substrate or acrylic substrate and a great number of minute cylinders (dots) arranged at random on the surface thereof. 4 is a photographic lens having the function of forming an image of an object.

Figure 2:
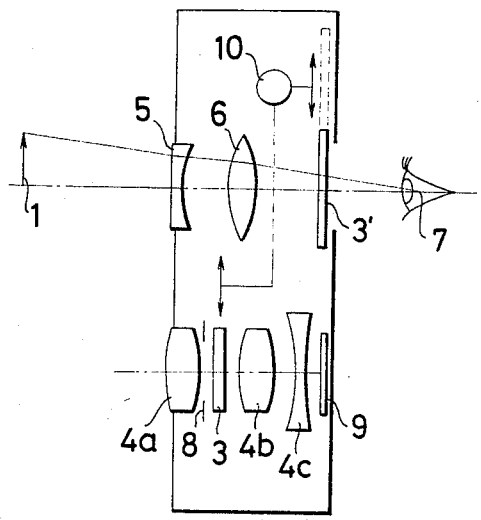
FIG. 2 is a side section view of the optics of a camera.

Also, FIG. 2 illustrates the construction of an optical system of the camera. 5 is an objective lens. 6 is an eye-piece lens constituting part of a finder of the reversed Galilean type. Behind the eye-piece lens 6 there is provided a phase type filter 3' arranged to be insertable into and retractable from the optical path of the finder. The phase type filter 3', though being similar in construction to that shown in FIG. 3, has somewhat different a characteristic.

On the other hand, 4a, 4b and 4c are lenses constituting the photographic objective. 8 is a diaphragm for determining the F-number. 9 is a silver halide film. The same filter 3 as that shown in FIG. 1 is releasably positioned adjacent the diaphragm 8. The phase type filters 3 and 3' are synchronously moved by a changeover mechanism 10.

These phase type filters are designed in such a way as to satisfy the following condition:

$$0.02A_L < A_F < 0.2A_L \tag{1}$$

where $A_L$ and $A_F$ are the diameters of the dots of the filter 3 for the photographic system and of the filter 3' for the finder respectively.

The function of the special portrayal filter is described in detail below. In order to visually recognize an equivalent filter effect in the finder image to that in the picture on the print paper, the spatial frequency characteristic of the optical system through which the object is seen as the picture on the print paper, that is, the combined optical system of the photographic optical system, enlarging optical system and the optical system of the naked eye must be coincident with that of the optical system through which the same object is seen as the finder image, that is, the combined system of the finder optical system and the naked eye's optical system.

Upon consideration of the spatial frequency characteristic in respect to, for example, cut-off frequency, letting $F_{Ci}$ denote the cut-off frequency on the retina, $M(F)$ the spatial frequency characteristic of the optical system of the eye, $\beta_f$, $\beta_L$ and $\beta_P$, the magnifying powers of the finder optical system, photographic optical system and enlarging optical system respecively, and $F_{Cf}$ and $F_{CL}$ the cut-off frequencies of the finder optical system and the photographic optical system respectively, when looking through the finder, the value of the cut-off frequency on the retina of the eye is determined by the following formula:

$$F_C = M(F) \cdot \beta_f F_{Cf} \tag{2}$$

when looking at the picture on the print paper, the value of the cut-off frequency $F_{C2}$ on the ratina of the eye is determined by the following formula:

$$F_{C2} = \frac{M(F)}{\beta_L \cdot \beta_P} F_{CL} \quad (3)$$

To equalize the effect viewed in the finder to that which will be produced in the picture on the print paper, we have $$F_{CL} = \beta_L \cdot \beta_P \beta_f F_{Cf} \quad (4)$$

In the general case, the three magnifying powers take values of $\beta_L = 0.01$–$0.05$, $\beta_P = 3$–$7$, and $\beta_f = 0.4$–$0.5$, depending on the object distance. Thus, there is no possibility of their product being unity.

To satisfy the just stated relationship, therefore, the filters usable in the finder optical system and the photographic optical system are required first to have different spatial frequency characteristics from each other.

Figure 4:
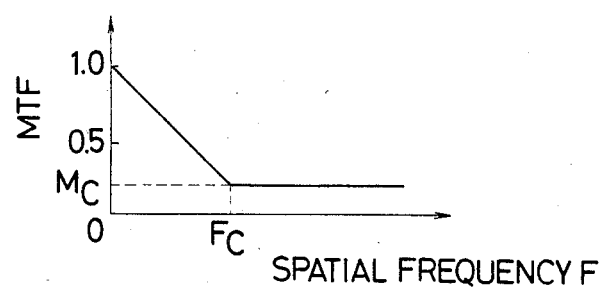
FIG. 4 is a graph of explaining the spatial frequency characteristic of the filter of FIG. 3.

When the filter 3 for soft focus having dot-shaped phase portions arranged at random is used in the image forming optical system the spatial frequency characteristic of the filter 3 has such a form as shown in FIG. 4. From this graph, the cut-off frequency $F_C$ and the spatial frequency characteristic value $M_C$ for that frequency $F_C$ can be obtained as expressed by:

$$F_C \approx a/(f \cdot \lambda)$$

$$M_C - |A_0 + A_\delta \exp(-ik\delta)|^2$$

wherein $\delta = (n-1)d$, $k = 2\pi/\lambda$ where a is the means value of the dot diameters, f is the focal length of the objective, $\lambda$ is the wavelength of light, $\delta$ is the difference between the lengths of the optical paths through the phase portion and through the other portion, $A_0$ and $A_\delta$ are the area ratios of the portions of phase zero and $\delta$ to the entire area, n is the refractive index of the phase portion, and d is the geometrical thickness of the phase portion.

For each optical system, the filter having such a space frequency characteristic as to satisfy the relationship (4) can be obtained by giving an appropriate value to the diameter of the dots forming the phase portions in accordance with variation of the focal length f of the objective and the wavelength $\lambda$ of light. The thus-obtained two filters are synchronously put into the respective optical systems of photography and finder, thereby it being made possible for the photographer to presume the filter effect accurately in the finder.

Let us now consider a numerical example of the filter for soft focus of such construction as shown in FIG. 3. If an object is shot with the objective whose focal length is 50 mm from a distance of 1.5 meters, and the negative is enlarged to the service size (about 80×110 mm), the lateral magnifiation $\beta_L$ is about 0.033, and the magnification of enlargement $\beta_P$ is 3. The magnifying power $\beta_f$ of the finder optical system is assumed to be 0.5.

Now, for the cut-off frequency on the print paper is taken at 6 lines/mm, the required value of the cut-off frequency in the object space of the photographic optical system is 0.6 lines/mm $$\left( F_{CL} = \beta_L \cdot \beta_P \cdot \frac{F_{C2}}{M(F)} = 0.033 \times 3 \times 6 = 0.6 \right).$$

From equation (4), the cut-off frequency $F_{Cf}$ in the object space of the finder optical system is found to be 12 lines/mm.

Each filter usable in the respective optical system must have such a construction as to satisfy these characteristics on the object space.

Here letting $A_f$ denote the dot diameter of the phase portion of the filter for the finder optical system, and assuming that the focal length $f_f$ of the eye is 20 mm, and taking the standard wavelength $\lambda$ of light at 580 nm, we have the cut-off frequency $F_{Cl}$ on the retina expressed as:

$$F_{Cl} = M(F) \frac{A_f}{f_f \cdot \lambda}$$

From this equation, the dot diameter $A_f$ is found to be 0.07 mm $$\left( F_{Cl} = M(F) \cdot \frac{A_f}{f_f \cdot \lambda} = M(f) \times \beta_f \times F_C \right).$$

Also on assumption that the space frequency of the photographic optical system without the filter shows an ideal characteristic, the dot diameter $A_L$ of the filter is found to be 0.05 mm.

$$\left( \frac{F_{CL}}{\beta_L} = \frac{A_L}{f_L \cdot \lambda} \right)$$

Thus, the characteristic of each filter for the respective optical system is determined by using the relationship (4).

The present invention has a feature that the above-stated inequalities of condition (1) are given for the dot diameters $A_L$ and $A_f$ by taking into account the various factors.

Thereby the present invention makes it possible to take photographs while observing nearly equivalent an image to that which will be finally obtained through the finder system.

When the lower limit of condition (1) is exceeded, or the dot diameter $A_f$ of the filter used in the finder system is smaller than 0.02 times the dot diameter $A_L$ of the filter used in the photographic optical system, the dots produce much diffracting light, making it difficult to observe the object image. When the upper limit is exceeded, or the dot diameter A is larger than 0.2 times the dot diameter $A_L$, it becomes difficult to achieve an uniform distribution of the dots though arranged at random, and, therefore, the soft focus effect is not sufficiently produced.

It is to be noted that in the embodiment of the invention the position of the filter 3' to be used in the finder optical system is not always limited to the rear of the eyepiece lens 6 shown in FIG. 2, and may be merely in the interior of the finder optical system.

Also, though the embodiment of the invention has been described in connection with the soft focus filter having the random dot-shaped phase portion as the special effect filter, the special effect filter in such a form that the central portion is normal and the marginal portion has a soft focus effect, or that a diffrection grating is utilized, may be used. Also, as for the shape of the dots, besides the circular shape, oval shapes may be used.

Figure 5:
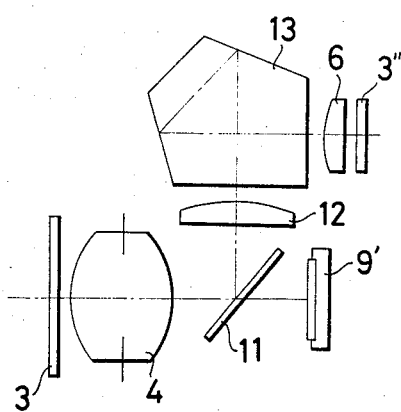
FIG. 5 is a side sectional view of the optics of a single lens reflex sitll video camera to which the invention is applied.

FIG. 5 is an example of application of the invention to a single lens reflex still video camera, where the same reference numerals have been employed to denote the similar parts to those shown above. Of the other numerals, 11 is a quick return mirror; 12 is a condenser lens; 13 is a pentagonal roof type prism. In this example, the observing optical path has the common photographic objective 4 of the photographic optical path. 9' is an image pickup element for producing video signals. The phase type filter 3 is assumed to be releasably attached to an outer barrel (not shown) of the photographic lens 4, and a phase type filter 3" is releasably attached to the back of the eyepiece lens 6. It should be pointed out that in this arrangement the phase type filter 3" because of its filtering again of the light which has passed through the phase type filter 3 does not follow the above-stated inequalities (1).

When to soft focus photography, the photographer attaches the phase type filter 3 to the objective, and inserts another phase type filter 3". He will then observe an object through these filters 3 and 3". This enables him to do works while making sure what portrayal effect will appear in the image of the television set, or the picture of the print paper.

As has been described above, according to the present invention, the characteristics of the special effect filters used in the photographic optical system and the finder optical system are made different from each other so that a method of shooting the special filter-equipped camera while observing almost equivalent an image to that which will be finally taken as a photograph or view becomes possible.

What is claimed is:

1. A camera comprising:
   (a) a photographic optical system having a photographic optical path and arranged to form an image of an object on an image receiver;
   (b) a finder optical system having an observation optical path to observe an object;
   (c) a special effect filter arranged in the photographic optical path to bring about a special portrayal effect on the object image; and
   (d) an auxiliary filter a different characteristic to that of said special effect filter and arranged in the observation optical path to bring about a special effect on an object image to be observed.

2. A camera according to claim 1, wherein said special effect filter and said auxiliary filter both bring about soft focus effects.

3. A camera according to claim 2, wherein said special effect filter and said auxiliary filter each are a phase type filter having dots arranged at random.

4. A camera according to claim 3, satisfying the following relationship:

$$0.02A_L < A_F < 0.2A_L$$

where $A_L$ is the dot diameter of said special effect filter, and $A_F$ is the dot diameter of said auxiliary filter.

5. A camera according to claim 1, further comprising: changeover means for synchronously putting said special effect filter and said auxiliary filter into their operative positions as normal photography is changed over to special portrayal photography.

6. A camera according to claim 1, wherein said auxiliary filter is releasably attached to the rear of an eyepiece lens of said finder optical system.

7. A shooting process comprising the steps of:
   (a) attaching a first filter to a photographic optical system so that a soft focus effect is produced on an image of an object formed on image receiving means by said system;
   (b) attaching a second filter having a different characteristic to that of said first filter to a finder optical system so that a soft focus effect is produced on an image of the same object to be observed; and
   (c) making an exposure while observing the object image.

8. A process according to claim 7, wherein said second filter is lower in cut-off frequency than said first filter.

9. A process according to claim 7, wherein said first filter and said second filter each are a phase type filter having dots arranged at random, satisfying the following relationship:

$$0.02A_L < A_F < 0.2A_L$$

where $A_L$ and $A_F$ are the dot diameters of said first and said second filters respectively.

* * * * *